United States Patent

[11] 3,631,496

[72] Inventors Charles Fink;
 Fred E. Burnham, both of Silver Spring;
 Maury I. Marks, Bowie, all of Md.
[21] Appl. No. 501,231
[22] Filed Oct. 22, 1965
[45] Patented Dec. 28, 1971
[73] Assignee Litton Systems, Inc.
 Silver Spring, Md.

[54] MULTIPLE DIGIT CODE DIRECTION FINDER SELF-ADJUSTING TO DIFFERENT FREQUENCIES
18 Claims, 22 Drawing Figs.
[52] U.S. Cl. .................................................. 343/113 R
[51] Int. Cl. .................................................. G01s 3/46
[50] Field of Search .......................................... 343/113, 113.1, 16.5 D, 5 DP

[56] References Cited
UNITED STATES PATENTS
3,170,135  2/1965  Yagelowich .................. 343/113 X
3,213,453  10/1965  Morrison, Jr. et al ......... 343/113

Primary Examiner—Rodney D. Bennett
Assistant Examiner—Richard E. Berger
Attorneys—Alfred B. Levine, Robert H. Lentz and Alan C. Rose ABSTRACT: A direction finding system producing a multiple digit code representing the direction of an emitted signal and including means for resolving ambiguities when the signal arrives at an angle normally giving rise to digit changeover.

Patented Dec. 28, 1971

INVENTORS
CHARLES FINK
FRED E. BURNHAM
MAURY I. MARKS

BY *Alfred B. Levine*

ATTORNEY

INVENTORS
CHARLES FINK
FRED E. BURNHAM
MAURY I. MARKS

BY *Alfred B. Levine*

ATTORNEY

INVENTORS
CHARLES FINK
FRED E. BURNHAM
MAURY I. MARKS

BY *Alfred B. Levine*

ATTORNEY

INVENTORS
CHARLES FINK
FRED E. BURNHAM
MAURY I. MARKS

BY

*Alfred B. Levine*

ATTORNEY

MULTIPLE DIGIT CODE DIRECTION FINDER SELF-ADJUSTING TO DIFFERENT FREQUENCIES

This invention relates to antenna array direction finding systems that are capable of substantially instantaneously determining the direction of a single incoming pulse by digital techniques, and is additionally concerned with a modularly constructed system of this type wherein the accuracy or resolution can be improved by adding additional modular units.

Very generally according to the invention there is provided an antenna array using one or more pairs of antennae and a digital processing system that processes the signals from the antennae by digital technique and divides the space under surveillance into a number of angular sectors with each sector identified by a digital code. When an incoming wave or pulse arrives from a particular sector, the system substantially instantaneously responds by producing the digital code associated with that sector. In a preferred arrangement the digital processing system is constructed of substantially identical modular units, and the accuracy or resolution of the system may be progressively improved by adding additional units.

According to additional features of the invention the system may be tuned to select only given incoming frequencies or may be made self adjusting to different frequencies by detecting the incoming frequency and translating the digital code. Consequently the system is capable of not only distinguishing between a series of pulses of the same frequency received from different directions but also between pulses at different frequency.

The mode of operation of the system essentially involves the making of a series of comparisons of processed amplitude signals obtained from the pairs of antennas. By a first comparison it is determined that the direction of the incoming wave or pulse falls within a broad angular sector and a first digit of the code is produced identifying this broad sector. By second and additional comparisons the incoming angle is progressively located within smaller and smaller angular sectors and the significant digits of the code are produced. By correlating the various digits of the code, the direction of the incoming wave or pulse is determined within a resolution provided by the least significant digit. Consequently by adding additional modular units and making further comparisons, the direction is defined within the accuracy desired.

It is accordingly one object of the invention to provide such a system that can very rapidly determine the direction of a single pulse; a series of such pulses; or a continuous wave.

A further object is to provide such a system that can observe space over a full 360° in any one plane or in more than one plane.

Another object is to provide such a system in modular form so that units may be added as desired to improve the accuracy or resolution.

A still further object is to provide such a system in which angular direction is very rapidly determined by digital techniques.

Another object is to provide such a system that can be adjusted to respond to any given wide band of frequencies and wherein the system can be made self-adjusting to different frequencies.

Figure 1:
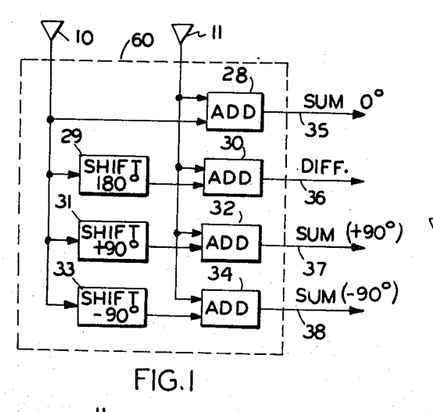
FIG. 1 is an electrical block diagram illustrating one manner of processing the signals for digital comparison.
Figures 2, 7:
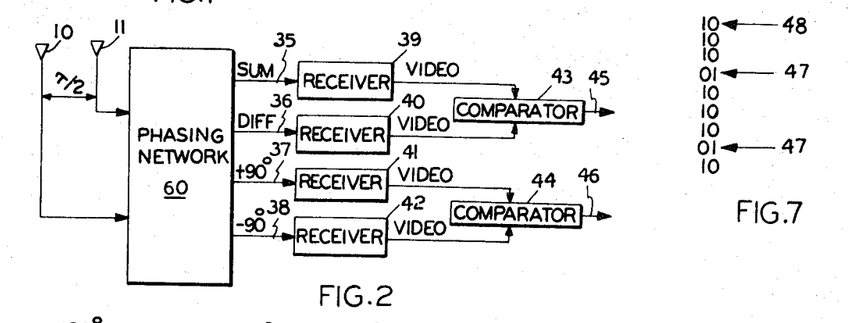
FIG. 2 is an electrical block diagram illustrating a coarse direction finding system.
FIG. 7 illustrates a typical tabulation of the output code from the coarse system of FIG. 2.

Other objects and additional advantages will be more readily understood by those skilled in the art after a detailed consideration of the following specification taken with the accompanying drawings wherein:

FIGS. 1 and 2 illustrate one preferred coarse direction finding system according to the invention for responding to an incoming wave or to a single pulse received over any angle within a spatial sector of 180° and producing a two-digit binary code defining the direction of the incoming wave within one of four angular sectors.

As shown, this coarse direction-finding system generally comprises a pair of spaced antennas 10 and 11 for receiving the waves and being suitably focused by a lens or reflector (not shown), a phasing network 60 for processing the signals from the pair of antennae, and a digital amplitude comparison system for comparing the amplitude of the processed signals to produce a two-digit code representing the direction of the incoming wave.

The phasing network 60 produces four processed signals. The first produced over line 35 is the sum of the antenna signals and is obtained by combining the signals in an adder circuit 28. The second processed signal produced over line 36 is the difference of the antenna signals and is obtained by reversing the phase of the signal from antenna 10 by means of phase shifter 29 and adding the shifted signal with that of antenna 11 in the adder circuit 30. The third signal is obtained by phase shifting the signal with that of antenna 11 in the adder circuit 30. The third signal is obtained by phase shifting the signal from antenna 10 by 90° by a phase shifter 31 and adding this phase shifted signal to that of antenna 11 in adder circuit 32. And the fourth process signal is obtained by oppositely phase shifting the antenna signal from antenna 10 in the phase shifter 33 and adding it to that of the antenna 11 in adder 34.

These four process signals are individually detected by receivers 39, 40, 41, and 42, to remove the radiofrequency carriers and produce the video or envelope signals, representing the absolute amplitude of these received antenna signals. These amplitude signals are then compared to obtain the two digit code representing the direction of the incoming wave. As shown in FIG. 2, the amplitude of the sum signal 35 is compared with that of the difference signal 36 in comparator 43 and a more positive signal (binary 1) is produced if it exceeds this signal and a more negative signal (binary 0) is produced if it is less than the difference signal. The processed signal including the 90° phase-shifted component is compared in amplitude with the processed signal including the minus 90° phase-shifted component, and similarly a binary 1 is produced at the output of comparator 44 where one signal exceeds the other, and a binary 0 is produced when the reversed condition prevails.

For an understanding of the manner wherein these compared amplitude signals determine the angle of the incoming wave, reference is made to FIGS. 3, 4, 5, and 6.

Figure 3:
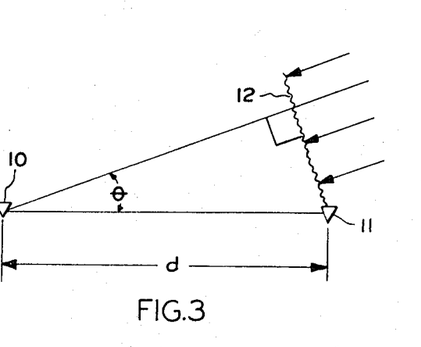
FIG. 3 is an illustration showing the angular relationship of an incoming wave or pulse to a pair of antennae.

As shown in FIG. 3, an incoming wave or pulse having a wavefront 12 reaches the pair of spaced antennas 10 and 11 at different times depending upon the angle of approach of the wave referenced to the common axis of the antennae. The amplitude of the received signals at both antennae is substantially the same but the short time delay produces a relative phase variation in the signal at the two antennae. Due to this phase shift, the sum of the two signals has an absolute amplitude that varies with the angle of the incoming wave as shown in the solid line polar plot pattern 13 of FIG. 4 and the difference in amplitude of these two signals differently varies with the angle as shown by the twin dotted line patterns 14 and 15 in FIG. 4. From these two patterns it is seen that the amplitude of the difference signal always exceeds the amplitude of the sum signal when the radio wave is received from spatial angles of from 0° to 60°, and from spatial angles extending from 120° to 180°, but conversely the amplitude of the sum signal always exceeds that of the difference signal where the wave is received from spatial angles extending from 60° to 120°. Consequently, when the output of comparator 43 in FIG. 2 produces a more positive signal or a binary 1, it is known that the incoming wave is being received from the spatial sector of from 60° to 120°. On the other hand, when the comparator 43 produces a binary 0, it is known that the incoming signal is being received from either the first spatial sector of 0° to 60°, or from the third sector from 120° to 180°.

To resolve this latter ambiguity, two additional synthetic lobe patterns are produced by phase shifting one of the antenna signals by 90° in opposite directions and adding each of these shifted signals to the other antenna signal. The additional synthetic lobe patterns produced from the processed signals using the phase-shifted components are shown by the polar plot of FIG. 5; the patterns produced using the positively phase-shifted signal being indicated by the solid line pattern 18 and 19, and the pattern using the negatively phase-shifted signal being shown by the dotted lines 16 and 17. Interpreting this latter polar plot, it is noted that the amplitude of the processed signal using the negatively shifted component 16 always exceeds the amplitude of the signal using the positively shifted component 18 where the radio beam is being received from a spatial angle from 0° to 90°. On the other hand, the opposite condition prevails where the radio beam or wave is received from an angle of 90° to 180°. Thus by means of the second amplitude comparison performed by comparator 44, the ambiguity arising from the first comparison is resolved.

Figures 4, 5, 6:
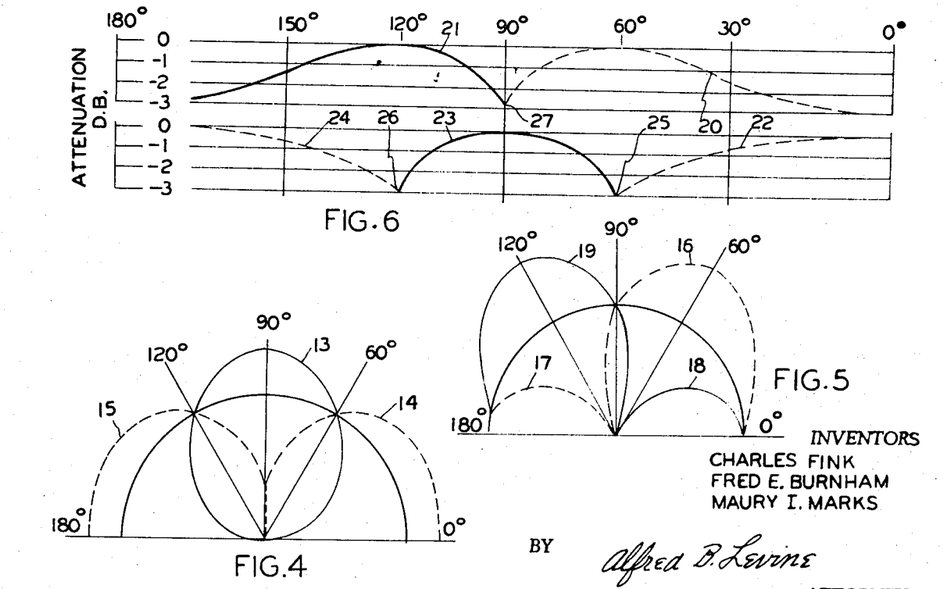
FIGS. 4, 5, 9, 10, and 13 are polar diagrams showing the variation in amplitude of processed signals from the antennae as the direction of the incoming wave varies.
FIGS. 6 and 11 are linearly arranged diagrams showing the difference amplitude of the processed signals for different directions of the incoming radio wave or pulse.

FIG. 6 illustrates by means of a linear-type plot the variation in amplitude of the greater of the processed signals for waves received by the antennas at any angle between 0° to 180°. The upper curves 20 and 21 illustrate that for received angles of 0° to 90°, the amplitude of the processed signal using the negatively phase-shifted component predominates over the positively shifted component to produce a negative output at comparator 44 (binary 0), and for angles between 90° and 180° the processed signal using the positively phase-shifted component predominates to produce a more positive output at comparator 44 (binary 1. The lower curves 22, 23, and 24 show that at angles of the received wave between 0° and 60°, and between 120° and 180°, the amplitude of the difference signal (binary 0) predominates whereas for angles of the incoming wave within the sector of 60° to 120°, the amplitude of the sum signal is greater (binary 1). Thus by correlating the amplitude comparisons from the two pairs of processed signals, the direction of the incoming wave can be determined within one of four angular sectors of 60° or 30°. For example, it is seen that for an output binary code of 00, the direction of the incoming wave is indicated to fall within the angular sector of 0° to 60°. For an output code of 01, the wave is being received from the angular sector from 60° to 90°; for the code 11, the wave is being received in the angular sector from 90° to 120°; and finally for the code 10, the wave is being received in the angular sector from 120° to 180°.

Since this system operates substantially instantaneously and the antennae observed over a full 180° in space, the system can almost instantaneously determine that a plurality of waves are being received at different times from different directions and can specify by code, the directions of these different waves. An example of this is shown in FIG. 7 illustrating a typical recorded tabulation of a series of codes produced by successively received waves. As shown, the first three recorded codes (binary 10) indicated by the number 48, shows that a wave is being received from an angular sector from 120° to 180°. The next recorded code (binary 01) indicates that a different wave is being received from a different direction within the sector of from 60° to 90°.

Figure 8:
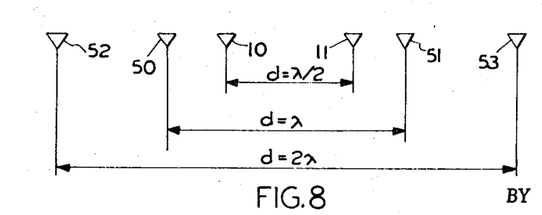
FIG. 8 shows the arrangement of an antenna array using multiple pairs of antennae.

To more accurately determine the direction of the incoming wave within progressively smaller or narrower angular sectors, a plurality of pairs of antennas may be used in a similar antenna array with each additional pair of antennas being spaced more widely apart than the preceding pair. As will be seen, the further apart the pairs of antennas are spaced, the greater is the phase displacement of the signals received, and, in turn, the greater will be the number of synthetic directional lobes produced for defining the direction of the incoming wave. For producing the polar lobe plots of FIGS. 4 and 5, the antennas are spaced apart approximately by one-half wavelength of the incoming wave frequency. FIG. 8 illustrates an antenna array using three pair of antennas; the first pair 10 and 11 being spaced apart by approximately one-half wavelength, the second pair 50, 51 being spaced apart by one wavelength, and the third pair 52, 53 being spaced apart by two wavelengths.

Figure 9:
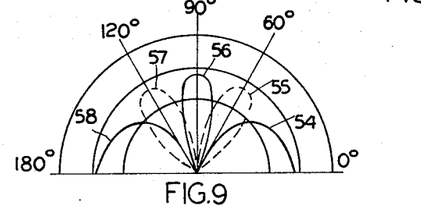
Figure 10:
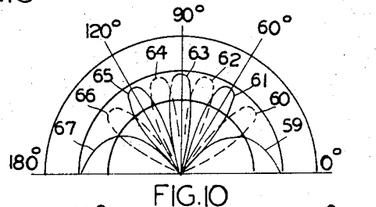

As is seen in the polar plot of FIG. 9, the second pair of antennas 50, 51 (spaced apart by one wavelength) produces three synthetic directional lobes 54, 56, and 58 covering the variation in amplitude of the sum signals, and two additional lobes 55 and 57 (in dotted lines) showing the variation in amplitude of the difference signal for different angles of the incoming wave. As seen in FIG. 10, the more widely spaced apart antennae 52 and 53 on the other hand produce four directional lobes having narrower angular sectors 59, 61, 63, 65, and 67 for the sum signals, and four additional lobes 60, 62, 64, and 66 (in dotted lines) for the difference signals.

Figure 11:
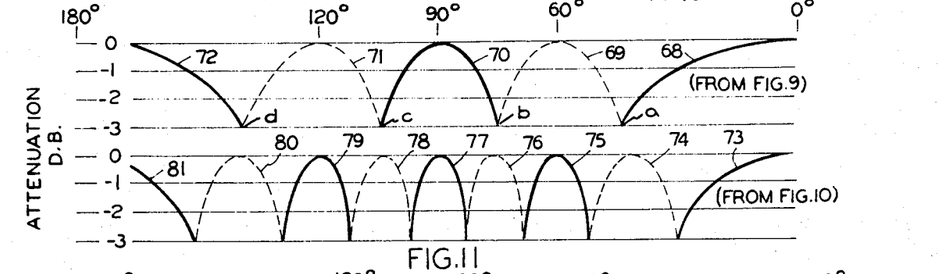

The greater of the amplitudes of the sum and difference signals for each spatial angle of the incoming wave obtained from the antennas 50 and 51 is shown in the upper linear plot of FIG. 11, and it is seen that the signals from this pair of antennas divides the spatial angle of the incoming wave into five sectors of smaller angles. The lower portion of FIG. 11 illustrating the greater amplitude of the sum and difference amplitude signals from antennas 52 and 53, shows that the third pair of antennas divides the spatial angle of the incoming wave into nine angular sectors of even smaller angle than the second pair of antennas. Thus it is seen that the digital comparisons obtained from the additional pairs of antennas 50, 51 and 52, 53 serve to further define or resolve the direction of the incoming wave with a progressively narrower angular sector.

Figure 12:
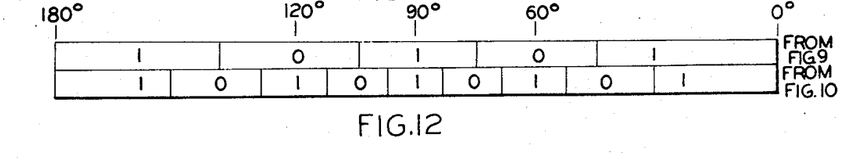
FIGS. 12 and 14 are digital plots illustrating the variation in the output digital code as the direction of the incoming wave or pulse varies.

The digital output of these comparator circuits can be represented even more simple than as shown in the linear plots of FIG. 11 by the digital-coded-type angular plot shown in FIG. 12. Here the upper angular code corresponds to the upper linear plot of FIG. 11 and the lower digital plot corresponds to the lower linear plot of FIG. 11. These coded plots show only the greater amplitude of the compared processed signals for each pair of antennas and represent the greater amplitude as a binary 1 if one of the amplitudes exceeds the other and by binary 0 if the reverse condition prevails. Referring to the upper digital plot obtained from antennas 50, 51, it is noted that the pair of antennas 50, 51 divides the 180° spatial sector into five angular sectors, and the lower coded plot obtained from the more widely spaced apart antennas 52, 53 divides the spatial sector into nine smaller angular sectors, overlapping those of first series. It will also be noted from FIG. 12 that at a number of different angles of the incoming wave, the code produced by comparison of the sum and difference amplitudes is the same, e.g. at 0°, 90°, and 180°. Therefore it is evident that the amplitude comparisons provided by the more widely spaced apart antennas produce narrower synthetic lobes to improve resolution but by themselves are not sufficient to resolve ambiguities and define the direction of the incoming wave. However, in combination with the digital plots obtained from the most closely spaced antennas 10 and 11, it will be seen that these ambiguities are resolved and the incoming wave can be defined within the angular sector of the closest or least significant digit.

Figure 13:
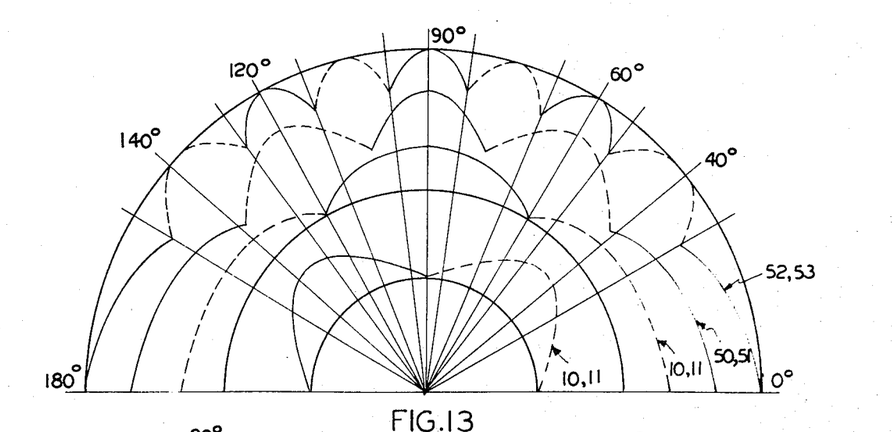

FIG. 13 shows a combined polar plot of the processed amplitude signals obtained from all pairs of antennas, obtained by combining the polar plots of FIGS. 4, 5, 9, and 10, and FIG. 14 is a linear coded plot, corresponding to the polar plot of FIG. 13, and illustrating the manner in which a system using all three pairs of antennas identifies the direction of the incoming wave within a resolution or accuracy that it many times greater than that of the coarse system.

Figure 14:
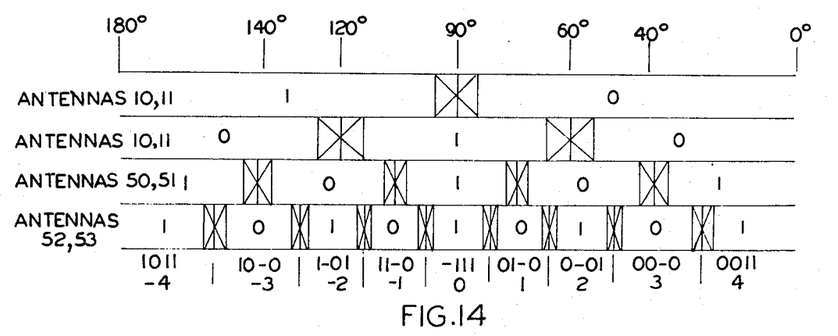

As shown in FIG. 14, the incoming wave is digitally defined within an angular sector of about 60° by processing the signals obtained from the more closely spaced antennas 10 and 11. The uppermost digital plot, using the 90° phase-shifted component from antennas 10, 11 produces the first binary digit of the code indicating that the incoming wave is being received over the sector of from 0° to 90° (binary 0) or from the sector of 90° to 180° (binary 1). The next digital comparison using the sum and difference signals from antennas 10, 11 serves to further divide the 180° spatial sector into three equal sectors of about 60°. Thus by correlating the binary code produced by these first two digits, the direction of the incoming wave is defined with an angular sector of 60°. The third and fourth codes obtained from the antennas 50, 51 and 52, 53, respectively, further divide these angular sectors to more accurately identify the direction of the incoming wave. Thus, for example, where the output binary code obtained from the system is 0011, it is known that the direction of the incoming wave lies in the angular sector from about 0° to 30° or where the output binary code is 1011, it is known that the direction of the incoming wave is from the angular sector of 150° to 180°.

The cross-hatched areas shown in FIG. 14 illustrate those angular sectors where the amplitudes of the processed signals being compared are so close to one another that it is difficult to determine which of the two amplitudes is greater. This is observed by returning to the linear plots of FIG. 11 which illustrates the amplitude difference of the compared signals from the antennas 50, 51 and 52, 53, for different angles of the incoming wave. As shown by the upper plot in FIG. 11, the greater in amplitude of the processed signals from the antennae 50, 51 is maximum at the angles of 0°, 60°, 90°, 120° and 180°, whereas the amplitude difference of these processed signals is close to a null at angles represented at $a$, $b$, $c$, and $d$; which amplitude is three decibels below the peaks. Consequently for incoming waves at angles where these null or lower amplitude positions occur, the binary digit produced is ambiguous and may be either a binary 1 or binary 0. Returning to FIG. 14, it is noted that these ambiguities do not overlap one another, and therefore by using a total of only three of the digits to define the direction of the incoming wave, the ambiguities can be resolved to only those that occur in the least significant digit (from antennas 52, 53). For example, considering the spatial angle of 60° or that of 120°, it will be noted that at both of these angles there is an ambiguity occurring in the second digit. However, since there is no such ambiguity in the first, third or fourth digit, the correct angles can be defined by these three other digits neglecting the ambiguous digit. Thus the angle 60° is defined by the three-digit binary code 0–01, and the angle 120° by binary code 1–01. In a similar manner where an ambiguity exists in the first or third digit, that ambiguity can also be ignored and the angle can be defined by a code consisting of the other three digits. This is not true of the last digit, and therefore the ultimate resolution or accuracy is determined by the last or least significant digit in the code. On the other hand by adding additional pairs of more widely spaced apart antennas and making further digital comparisons of processed signals, the ambiguities in the fourth or lower digits can be successively resolved and the angle of the incoming wave can be more accurately defined within progressively narrower angular sectors as desired.

Figure 15:
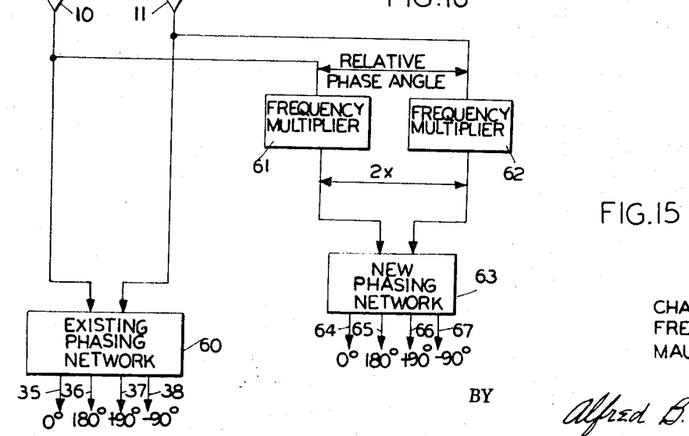
FIG. 15 is a block diagram illustrating an alternative manner of improving the resolution of the system.

FIG. 15 illustrates a different manner of improving the accuracy or resolution of the system using only a single pair of antennas. In this embodiment, the signals from antennas 10 and 11 are processed in the same manner as in FIGS. 1 and 2 to derive the sum and difference signals and the processed signals including the 90° phase-shifted components. These processed signals are compared in amplitude as in FIG. 2, to obtain the first two digits of the binary code as described above. However instead of adding additional pairs of more widely spaced antennas to derive the additional digits, the signals from antennas 10 and 11 are each individually multiplied in frequency by frequency multipliers 61 and 62 and these frequency multiplied signals are processed to obtain the sum, difference, and 90° phase shifted components as before to produce additional directional lobes. Each of these latter signals are also digitally compared in amplitude as before to yield the desired additional digits that more accurately define the direction of the incoming wave.

The theory of operation of this embodiment is similar in some respects to that of the first embodiment due to the fact that multiplying the frequency of these signals multiplies the phase difference of the voltages induced in the antennas by the incoming wave. Thus if the frequency of the antenna signals is doubled, it is the same in effect as doubling the spacing between the antennas which would also double the phase-shift difference. It will be recalled that the amplitude comparisons are made of the video or detected signals to derive the digital code, and therefore the frequency multiplication of the signals has no effect upon the digital processing since the carrier frequencies are removed before the amplitude comparisons are made.

To improve the accuracy even further, the antenna signals may be further frequency multiplied by using additional frequency multiplier stages to quadruple or otherwise increase the relative phase angle of the signals obtained by the antennas. This is similar in effect to adding still additional pairs of antennas that are spaced more widely apart as in the array shown in FIG. 8. Thus a highly accurate system can be constructed using only a single pair of antennas together with a plurality of stages of different ratio frequency multiplication instead of using plural pairs of antennae for the same purpose as shown in FIG. 8. However in a practical system, the signal-to-noise ratio decreases for each additional frequency multiplication, and the complexity and cost of the frequency multiplying circuitry and components may be greater than the cost of using additional antenna elements. Consequently, the choice of using additional pairs of antenna or frequency multiplication stages in a particular system will depend upon the strength or power of the incoming wave being received together with the considerations of the cost, complexity, and size of the system components for processing the signals.

Figure 16:
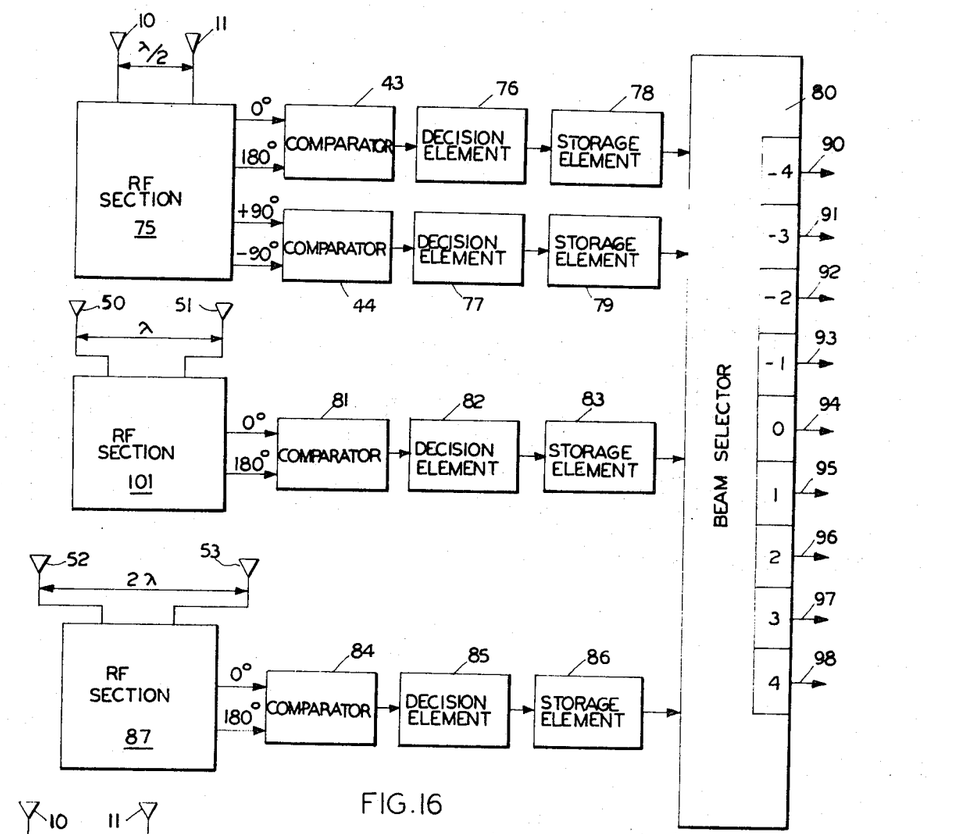
FIG. 16 is a block diagram illustrating a system using the antenna array of FIG. 8 and translating the digital code output to operate directional indicators.
Figures 19, 20, 21, 22:
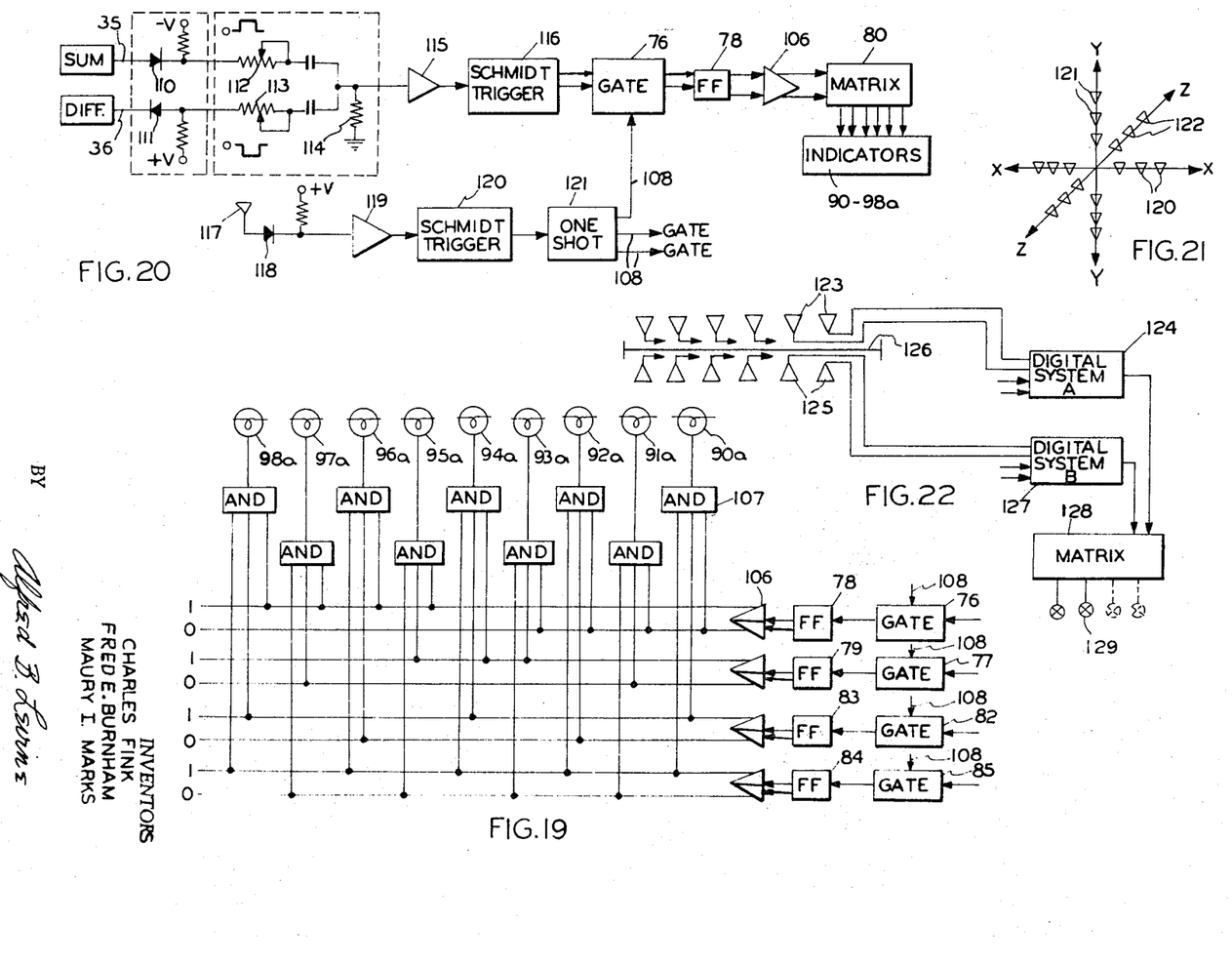
FIG. 19 is an electrical schematic diagram illustrating the connection of directional indicators to the system.
FIG. 20 is an electrical schematic diagram illustrating circuit details of a preferred single modular unit according to the invention.
FIG. 21 is a three-dimensional diagram illustrating the application of a system to surveillance of all three dimensions in space.
FIG. 22 is an electrical schematic diagram illustrating a system for observing over a full 360°.

FIGS. 16 and 19 illustrate a digital direction-finding system using three pairs of antennae, and additionally illustrate the coupling of this digit system to selectively operate a series of indicators each of which displays the direction of the incoming wave within a given angular sector. A system of this type for directly indicating the angle of the incoming radio wave is particularly advantageous for portable direction-finding systems where it is desired to substantially instantaneously detect and display the direction of a stationary or movable source of radio waves, pulses, or a single pulse.

As shown, the signals from each pair of antennae are processed and detected as described above, in what may be termed the RF sections 75, 101, and 87, respectively, and the amplitudes of these selected pairs of processed signals are compared in comparator circuits 43, 44, 81 and 84, as also described above, to obtain the differences in amplitude and provide the code. These signals from comparators 43, 44, 81, and 84 are then directed to decision elements 76, 77, 82, and 85, respectively, which supply code pulses to suitable storage elements 78, 79, 83 and 96, respectively, for storing the output code. For selectively energizing the proper one of a series of direction indicators, the stored code is translated by means of a matrix, generally indicated by block 80 in FIG. 16 to provide a single output pulse or signal to the appropriate one of a series of output lines 90 to 98 leading to individual indicators.

As shown in FIG. 19 the decision elements may comprise conventional-type gate circuits that are opened and closed by an external clock or sync source (not shown) over line 108 to direct the DC output from the comparator circuits to conventional flip-flop circuits that serve as the storage elements. These flip-flops are triggered in one direction or the other depending upon the output of the comparator circuits to store a binary 1 or a binary 0. A matrix connection couples the outputs of preselected ones of the flip-flops to energize the appropriate ones of the indicator lights 90a to 98a according to the stored binary code. As shown, the matrix may be of conventional construction and interconnecting the flip-flops, to the indicators through AND-gates 107. Each of the indicators which is connected to an associated AND-circuit 107 which in turn responds to selected ones of the four pairs of output lines from the amplifiers 106. The connections are made such that each indicator will respond to a different predetermined code stored in the four flip-flop circuits and be energized only when the preselected code is received on all of its three AND circuit lines. Each of these indicators is suitably marked to display the direction of the incoming wave.

In a portable direction finding system, the antennas and indicators may be supported on a movable housing which can be manually or otherwise positioned to scan in different directions. In a preferred construction the indicators are arranged in spaced relationship across the housing so as to immediately reveal the direction of the incoming wave.

A portable system embodying the present invention has been constructed that is very small in size, light in weight, inexpensive, and using prefabricated modular unit circuitry of a conventional nature. Further reductions in size and weight can be obtained using hybrid or integrated circuits. One channel of this preferred signal processing circuitry is shown in FIG. 20 to illustrate the simplicity of this system. As shown, the sum and difference signals over lines 35 and 36 are detected by simple crystal diodes 110 and 111 to produce the video or DC amplitude signals, and these are compared in opposition by a simple resistor network to produce the difference signal. Most specifically, the crystal diodes 110 and 111 are disposed in oppositely poled relationship with respect to the sum and difference signals whereby the detector 110 passes only a positive going envelope or video signal and detector 111 produces only a negative going video signal. These positive going and negative going video signals are directed through adjustable resistors 112 and 113, respectively, interconnected in a summing circuit with resistor 114. When the amplitude of the positive going video signal predominates over the negative going video signal, a more positive potential is produced across resistor 114 and where the opposite condition prevails, a more negative potential is produced across resistor 114. The more positive potential represents a binary 1 condition and the more negative potential represents a binary 0 condition. This difference signal is amplified by means of amplifier 115 and directed to a Schmitt trigger circuit 116 that produces and amplified square wave pulse of greater or lesser amplitude representing the binary 1 or binary 0 condition, and this square wave is thence directed to the input of gate circuit 76. When the gate is operated by a pulse at binary 1 condition, a pulse is directed to one of the input lines of the flip-flop 78, and a pulse at binary 0 energizes the other line of flip-flop 78. A pulse having a binary 1 amplitude condition therefore triggers the flip-flop in one direction, and a pulse at binary 0 amplitude triggers the flip-flop in the opposite direction. The output of flip-flop 78 is directed through amplifier 106 and the matrix 80 and together with the energization from the other channels energizes the appropriate one of the indicators 90a to 98a as described above in connection with FIG. 19. In the preferred system, the storage flip-flops 78 retain the binary code identifying the direction of the last-received incoming radio wave until changed by the next succeeding pulse or wave. For operating the gate and flip-flop, there is provided an additional antenna 117 and a crystal receiver 118 for detecting incoming radio waves or pulses and producing a control video signal that is directed through amplifier 119 and Schmitt trigger 120 to produce an amplified control pulse for each incoming wave or pulse received by the antenna 117. This square pulse generated by the Schmitt trigger 120 operates a one-shot multivibrator 121 to produce a pulse for triggering the flip-flops into the binary 1 or binary 0 condition as determined by the output of the associated Schmitt trigger circuits. In this manner, the system can respond to and can indicate the direction of only a single incoming pulse or a succession of pulses, and it retains the digital information or display representing the direction of this pulse until it is changed by the next succeeding incoming wave or pulse received by the antennas. The antenna 117 may be a separate antenna in addition to those provided in the array or it may be one of the antennas in the array that is also used for this control function.

In the system described above, a single antenna array is used to maintain surveillance over a spatial angle of 180° in one plane. In this case, the antenna elements used are made directional to observe only the desired area, or alternatively suitable lenses or reflectors are employed to focus the array. Where it is desired to observe over a full 360° in any one plane, a pair of systems may be used as shown in FIG. 22. In this case, the first array 123 observes over a full 180° in one direction and is provided with a digital processing system 124 to produce the digital code identifying the direction of any radio signals observed within the surveyed area, and the second array 125 observes over the remaining 180° and is likewise provided with a digital processing system 127 to produce the identifying code. Both digital processing systems jointly feed a matrix 128, that may be similar to that of FIG. 19, to energize the appropriate one of a series of indicators 129 for almost instantaneously displaying the direction of an incoming radio pulse from any direction over the 360° observed area. As shown, a reflector 126 may be used to separate the arrays and focus each on its observed area.

Direction finding in more than one geometric plane may likewise be obtained by using a mattress array of antenna elements in the same general manner with the signals from each linear array being digitally processed as described to produce its digital code and with the codes being combined in a matrix to energize appropriate indicators for instant display, or being otherwise digitally processed or recorded. FIG. 21 illustrates one manner of direction finding in three geometric planes using an antenna array 120 disposed along the X—X axis, a second antenna array 121 along the Y—Y axis, and a third array 122 along the Z—Z axis. By providing three double pairs of mattress arrays (not shown) along three orthogonal axis, three dimensional space may be fully observed and the direction of any incoming radio pulse identified.

VARIATION OF THE CODE WITH FREQUENCY

The above described mode of operation applies where the frequency of the incoming radio pulse or wave is known, and the pairs of antennas are spaced apart at a given number of wavelengths of this known frequency as shown in FIG. 1 and in FIG. 8. If the frequency of the incoming radio pulse is higher or lower than that for which the system is designed, the comparative phase shift obtained from the antenna signals is respectively greater or lesser, and the lobe patterns of FIGS. 4, 5, 9, 10, and 13 are displaced to vary the output code. Consequently although the output code is correct at the designed frequency it is incorrect at other frequencies, and the greater the frequency deviation, the greater will be the error.

Figure 17:
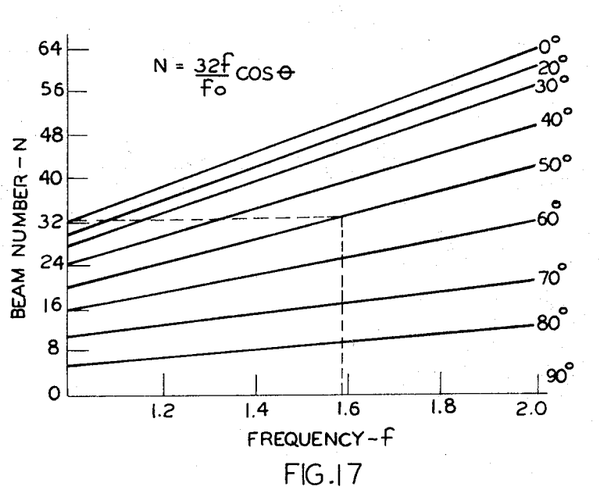
FIG. 17 is a graph illustrating the variation in the output with frequency.

It has been found, however, that at any given angle or direction of the incoming radio wave referenced to the axis of the array, that the output code varies linearly with change of frequency, and therefore having knowledge of the frequency of the radio pulse, the code can be corrected. A plot of the linear variation of the output code with frequency is shown in FIG. 17. Referring to FIG. 17 and taking as an example on incoming radio a pulse arriving at an angle of 50°, it is seen that this incoming radio pulse results in an output code produced (or beam number) of 24 at the designed frequency of the system but the output code number linearly increases with increase in frequency such that at a frequency of about 1.6 times the designed frequency, the code number produced is 32. In a similar manner it is observed that the code number linearly increases with increase in frequency for incoming pulses at all other angles except for those arriving at an angle of 90° to the array. In this latter case, the signals received by all antennas is in phase. The variation of the code or code number with frequency can be shown to be as follows:

$$N = \frac{Kf}{f_0} \cos \theta$$

Where N is the code or code number,
$f_o$ is the frequency for which the system is designed,
$\theta$ is the angle of the incoming radio pulse referred to the array, as shown in FIG. 1, and
K is one-half the total number of sectors within 180° at $f_o$.

Figure 18:
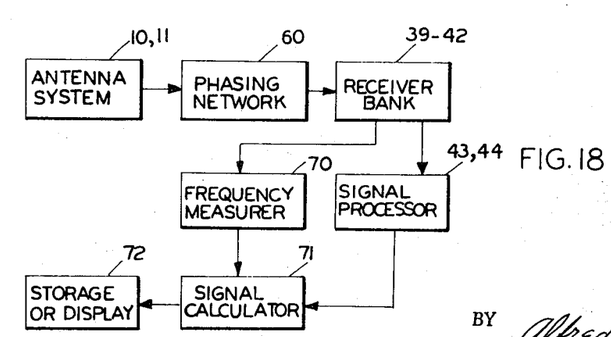
FIG. 18 is a block diagram illustrating a system that is self-adjusting to frequency variations.

To correct for this error with frequency, the output code produced by the system can be manually translated using a nomograph like that of FIG. 17 which is for a 64 sector system, or this may be performed automatically as shown in FIG. 18. In this embodiment, the frequency of the incoming wave or pulse is detected by means of a frequency detector 70, of any well-known type, and a signal representing this frequency is directed to a signal calculator 71. Concurrently the antenna signals are processed as before through phasing network 60, receivers 39 to 42, and comparator-storage devices 43, 44 to derive the digital output code. This digital output code is then directed to the signal calculator 71 where it is translated to correct the code for that frequency. As will be noted from the above formula, the correction being made involves a simple mathematical operation since the variation in code number with frequency is linear. Therefore the signal calculator 71 may employ conventional circuits for this purpose. The translated or corrected code from the multiplier 71 is then directed to suitable storage or display devices 72 in the same manner as discussed above to almost instantaneously display or record the direction of the radio pulse or wave.

As is believed now evident, the direction finding system of the present invention is capable of many changes and variations. The system is preferably constructed in modular form with each pair of antennas being provided with an identical modularly constructed digital independent processing system, as indicated in FIG. 20, so that additional pairs of antennas and associate modules may be added to and deleted to meet the needs of a particular system. Both two and three dimensional systems may be assembled in this manner by arranging the antennas and modules in various configurations and mattress arrays. Within each modular unit, the digital processing circuitry and the recording or display means are the same for all frequencies since these portions of the circuitry are dealing with DC or video signals. The receivers for detecting the signals will, of course, vary depending upon the frequency band. They may be simple crystal video detectors for radio frequencies as shown in FIG. 20, or more sophisticated superheterodyne automatic band scanning devices. For sonic, supersonic, or light frequencies other types of transducers and receivers will be used. The antennas used will also vary according to the frequency to be detected and the specific components used will determine the frequency bandwidth, total angular coverage, and sensitivity. The antennas may in many instances be simple monopoles over a ground plane, or planar spirals, or parabolic dishes. Components of these types are well known to those skilled in the art and further descriptions are not considered necessary. Since these and many other variations may be made without departing from the spirit and scope of this invention, this invention should be considered as being limited only by the following claims:

What is claimed is:

1. A direction of finding system comprising: a pair of spaced antennas, and a rapid digital processing system responsive to the signals from the antennas to provide a digital code representative of the angle between an incoming wave referenced to a plane containing said pair of antennas, said digital processing system including a first decision making means for determining whether the sum of the signals from the antennas is greater or less than the difference between said signals and producing a digital indication, and including a second decision making means, including phase-advancing and -retarding means for one of said signals, for determining whether the sum of the other signal and the phase-advanced signal is greater or less than the sum of the other signal and the phase-retarded signal and producing a second digital indication.

2. A digital beam direction-finding system comprising: a pair of spaced antenna elements, means for adding the signals from said elements, means for differencing the signals from said elements, means for comparing the amplitude of said added signals with the amplitude of said difference signals and producing a digital code indicative of the greater amplitude, means for phase advancing the signals from one of said elements, means for equally phase retarding the signal from the same element, means for separately adding the signal from the other element with each of the phase-advanced and -retarded signals to produce first and second processed signals, means for comparing the amplitudes of said first and second processed signals and producing a second digital code indicative of the greater amplitude, and means responsive to the first and second digital code to determine direction.

3. A digital direction finding system having two displaced antenna elements responsive to an incoming beam comprising: means for comparing the amplitude of the sum of signals from said elements with the amplitude of the difference of the signals from said elements and producing a digital code indicative of the greater amplitude, means for equally phase-advancing and -retarding the signal from one of said elements, means for separately adding the signal from the other element with each of the phase-advanced and phase-retarded signal to obtain a first and second processed signal and producing an additional digital code indicative of the greater amplitude, and means responsive to said digital code and additional digital code to determine the direction of the beam.

4. A digital system for determining the direction of an incoming wave referenced to an antenna array comprising: a first pair of spaced antenna elements in said array, digital decision making means responsive solely to the comparative amplitudes of the signals from said antenna elements for producing a multiple digit code indicative of the direction of the incoming wave within a given one of a plurality of wide angular sectors, a second pair of spaced antenna elements spaced more widely apart than the first pair, a second digital decision making means responsive solely to the comparative amplitudes of the signals from said second pair of antenna elements for producing a second multiple digit code indicative of the direction of the incoming wave within any one of a plurality of narrower angular sectors than said wide angular sectors, and means responsive to said first and second digital codes for determining that one of the narrower sectors falling within the given wide angular sector.

5. In the system of claim 4, an additional pair of antenna elements spaced more widely apart than said second pair and an additional digital decision making means solely responsive to the comparative amplitudes of the signals from said additional pairs of elements for producing an additional digital code indicative of the direction of the incoming wave within any one of a plurality of still narrower angular sectors than said narrow angular sectors, and means responsive to said first, second, and additional digital codes for determining that one of the still narrower angular sectors falling both within the narrower angular sector and the wide angular sector.

6. In a direction finding system for an incoming wave, an antenna array comprising a plurality of pairs of spaced antenna elements, with each pair being progressively spaced further apart than the preceding pair, a digital processing system for each pair of elements responsive solely to the comparative amplitudes of signals from its associated pair of elements, the digital processing system for each pair of elements beginning with the most closely spaced elements determining the positioning of the incoming wave within progressively smaller angular sectors and each producing a multiple digit code indicative of said positioning, and means responsive to the digital codes from said processing systems for determining the location of said incoming wave.

7. In a direction-finding antenna array, a pair of spaced antenna elements, a digital processing system responsive solely to the amplitudes of signals from said elements to produce a multiple digit code indicative of the angular position of an incoming wave referenced to the common axis of said elements, said digital processing system including means for frequency multiplying the signal from each element, and including means for adding and subtracting the amplitudes of said frequency multiplied signals and producing a digital code indicative of whether the added amplitude is greater or less than the subtracted amplitudes.

8. In the antenna array of claim 7, said digital processing means further including means for adding and subtracting the amplitudes of signals from said antenna elements and producing a second digital code indicative of whether the added amplitudes is greater or less than the subtracted amplitudes.

9. In the antenna array of claim 7, said digital processing means further including means for equally phase advancing and phase retarding the signal from one of said elements, and including means for separately adding the signal from the other of said elements with each of the phase advanced and retarded signals, and additionally including means for comparing the amplitudes of said separately added signals and producing a digital code indicative of the greater amplitude.

10. A digital direction finding system that is self-adjusting to different frequencies of an incoming wave comprising: a pair of spaced antenna elements, a digital processing system responsive solely to the amplitudes of signals from said elements to produce a multiple digit code indicative of the angular position of an incoming wave referenced to the common axis of said elements, and means responsive to the frequency of the incoming wave for translating the digital code to the correct code for the frequency received.

11. A substantially instantaneous direction finding system for traveling waves comprising: a pair of spaced transducers, means for combining the signals from said transducers to obtain a processed signal whose amplitude varies according to the direction of the incoming wave referenced to said transducers, and digitizing means for obtaining from said processed signal a multiple digit code representative of the direction of the incoming wave.

12. In the system of claim 11, a system of indicators energized by said code for substantially instantaneously indicating the direction of the wave.

13. In the system of claim 11, an additional pair of transducers oriented along a different axis than said first-mentioned pair, means responsive to said additional pair to produce a second digital code representing the direction of the wave referenced to said additional pair, and means correlating said first and second digital codes to more precisely determine the direction of the wave.

14. A direction-finding system comprising: an array of spaced transducers, a plurality of independent modules each responsive to signals from a pair of transducers of said array to provide different digits of a digital code representing the direction of an incoming wave referenced to the axis of said array, with one of the modules producing at least a two-digit code from a pair of transducers, and means for correlating the different digits to provide a code representing the direction of the wave.

15. In the system of claim 14, means responsive to the frequency of the wave to translate the code number.

16. In the system of claim 14, each of the modules independently responding to said signals whereby additional modules may be added to determine the direction with greater definition.

17. In the system of claim 14, each of the modules comprising a means for combining a pair of signals to obtain a processed signal whose amplitude varies according to the direction of the wave, receiver means for detecting the amplitude, and means for producing a digital code representing direction.

18. A direction-finding system comprising: an array of spaced transducers, a plurality of independent modules each responsive to signals from said array to provide different digits of a digital code representing the direction of an incoming wave referenced to the axis of said array, and means for correlating the different digits to provide a code representing the direction of the wave, an additional array of spaced transducers disposed along a different axis than said first array, a second plurality of independent modules each responsive to signals from said array to provide different digits of a second digital code representing the direction of an incoming wave referenced to the axis of said additional array, and means correlating said second code with said first-mentioned code to determine the direction of the wave referenced to both arrays.

* * * * *